United States Patent [19]

Bauernfeind et al.

[11] 4,423,082

[45] Dec. 27, 1983

[54] METHOD FOR MANUFACTURING QUICK COOKING PASTA PRODUCTS

[75] Inventors: John Bauernfeind, Cherry Valley, N.Y.; Russell W. Carnahan, Evanston, Ill.; Norman Lodal; Domingo Vazquez, both of Skokie, Ill.

[73] Assignee: Kraft, Inc., Glenview, Ill.

[21] Appl. No.: 323,723

[22] Filed: Nov. 23, 1981

[51] Int. Cl.$^3$ ............................................. A23L 1/16
[52] U.S. Cl. ................................. 426/557; 426/451; 426/511; 426/558
[58] Field of Search ................ 426/557, 451, 510, 511

[56] References Cited

U.S. PATENT DOCUMENTS

| | | | |
|---|---|---|---|
| 2,704,723 | 3/1955 | Poole | 99/85 |
| 3,113,869 | 12/1963 | Lee | 99/85 |
| 3,138,462 | 6/1964 | Katz | 99/85 |
| 3,162,536 | 12/1964 | Kaufmann | 99/85 |
| 3,192,049 | 6/1965 | Kinsley | 99/85 |
| 3,251,964 | 5/1966 | Scotland | 99/85 |
| 3,252,805 | 5/1966 | Sienkiewicz | 99/85 |
| 3,318,707 | 5/1967 | Ernst | 99/85 |
| 3,352,686 | 11/1967 | Mancuso et al. | 99/85 |
| 3,458,321 | 7/1969 | Reinhart et al. | 99/85 |
| 3,482,993 | 12/1969 | Finucane | 99/85 |
| 3,484,251 | 12/1969 | Lawrence et al. | 99/85 |
| 3,537,862 | 11/1970 | Peters et al. | 99/85 |
| 3,544,333 | 12/1970 | Glabe | 99/85 |
| 3,615,677 | 12/1971 | Scharschmidt et al. | 99/85 |
| 3,728,130 | 4/1973 | Egan et al. | 99/85 |
| 3,762,931 | 10/1973 | Craig et al. | 99/85 |
| 3,846,563 | 12/1974 | Cunningham | 426/158 |
| 3,892,874 | 7/1975 | Ando | 426/303 |
| 3,949,101 | 4/1976 | Murthy | 426/557 |
| 4,044,165 | 8/1977 | Baumann | 426/557 |
| 4,098,906 | 7/1978 | Hisaki et al. | 426/94 |
| 4,126,706 | 11/1978 | Hilton | 426/438 |
| 4,178,393 | 12/1979 | Gregersen | 426/653 |
| 4,181,746 | 1/1980 | Shin | 426/335 |
| 4,230,735 | 10/1980 | Yoshida et al. | 426/451 |
| 4,243,690 | 1/1981 | Murakami et al. | 426/451 |

*Primary Examiner*—Raymond N. Jones
*Assistant Examiner*—Elizabeth A. Hatcher
*Attorney, Agent, or Firm*—Fitch, Even, Tabin & Flannery

[57] ABSTRACT

Method for manufacturing quick cooking pasta products in which pasta components are initially heated to a temperature above 235° F. under specified conditions, cooled to a temperature of 200° F. or lower, and extruded. The extruded pasta product is rapidly dried to provide a quick cooking, high quality pasta product without checks, blisters or stress cracks.

14 Claims, 3 Drawing Figures

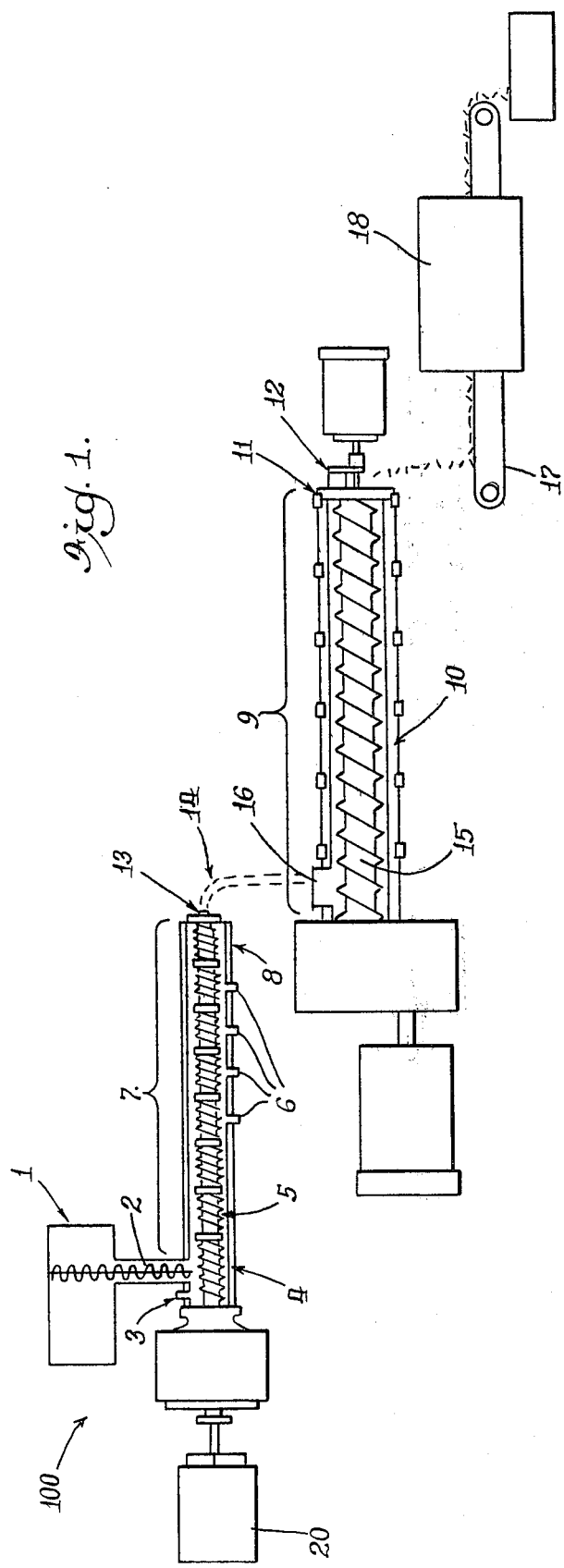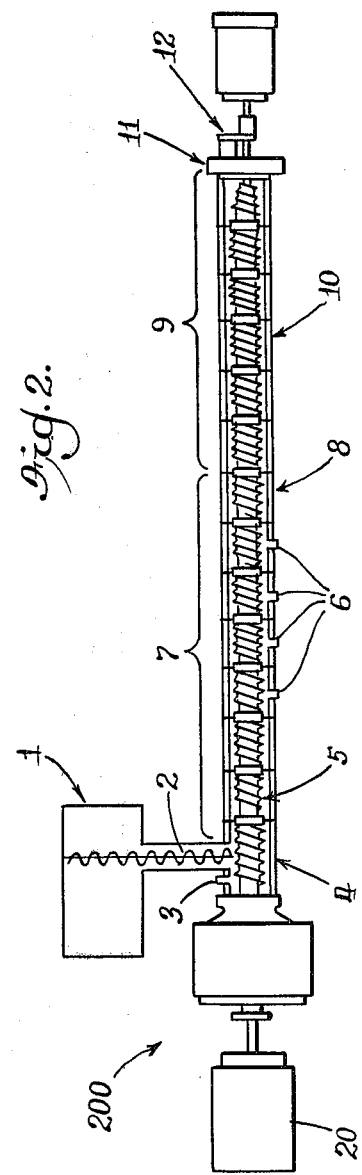

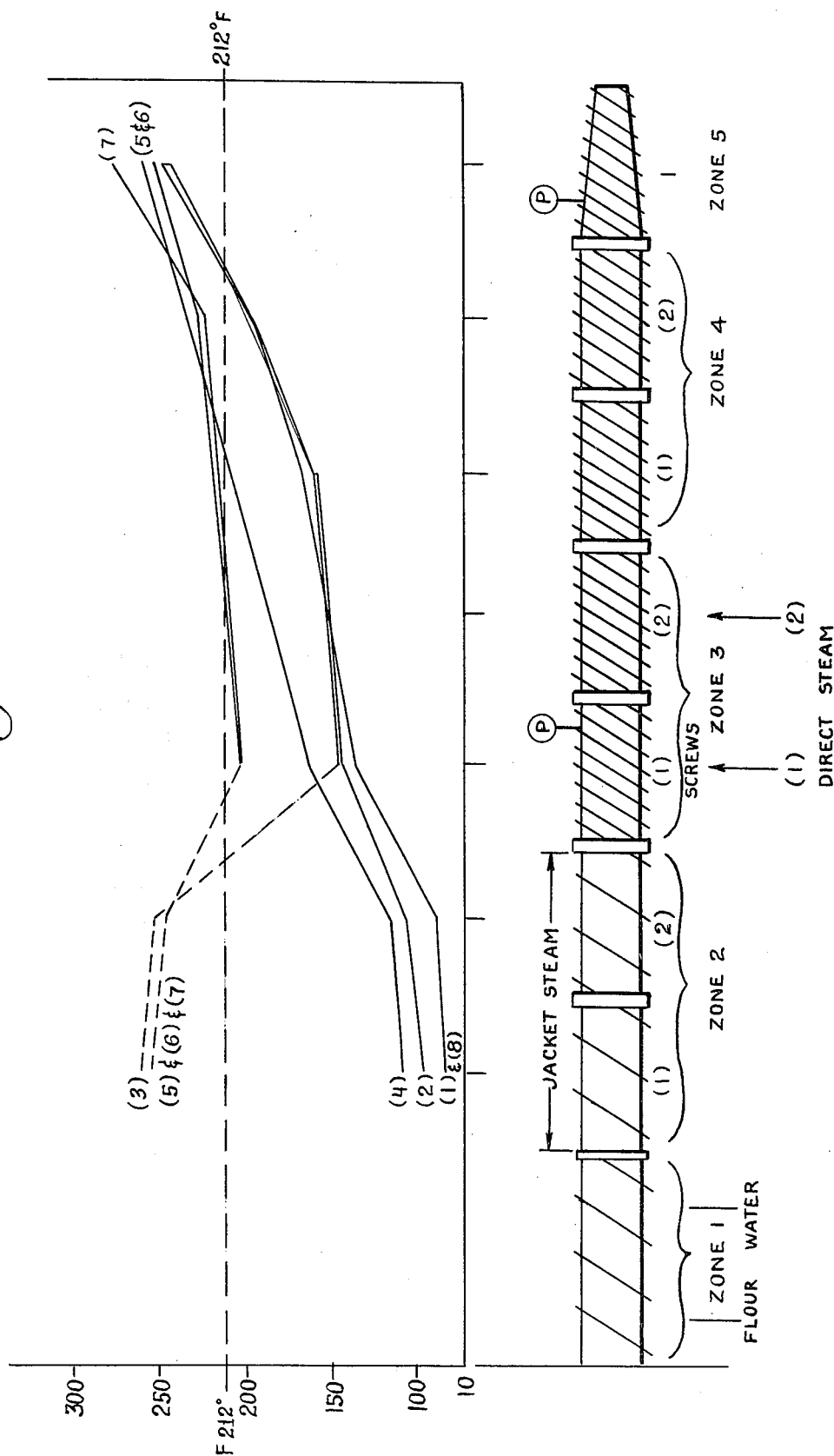

METHOD FOR MANUFACTURING QUICK COOKING PASTA PRODUCTS

The present invention relates to methods for manufacturing alimentary paste type products, or pasta, such as macaroni, spaghetti, vermicelli, noodles and the like, and more particularly, methods for continuous manufacture of such pasta products which may be readily rehydrated.

Conventional pasta products are manufactured by extrusion of an uncooked, aqueous flour paste into desired shapes, and subsequently air drying of the extrusion formed products for an extended period of time to provide a dried, uniform product without stress cracks or other defects. Such conventional pasta products require a substantial cooking time (e.g., 10 to 12 minutes) in boiling water in order to hydrate and gelatinize the starch to provide a cooked product.

Substantial effort has been directed to the development of pre-cooked pasta products, as exemplified by U.S. Pat. Nos. 3,671,264; 3,537,862; 4,044,165; 3,846,563; 3,138,462; 4,098,906; 3,192,049; 3,892,874; 3,600,192; 2,677,613; 3,495,989; 3,251,694; 3,352,686; 3,484,251; 2,768,086; 3,482,993 and 3,728,130. Despite such development efforts, however, there are various disadvantages in conventional pre-cooked pasta products and manufacturing processes for such products, and improved pasta products and processes would be desirable.

A continuous process for readily manufacturing quick cooking pasta products which meet the Standards of Identity of the Food and Drug Administration for Macaroni and Noodle Products, as well as improved imitation pasta products would be desirable. Further, improved methods which provide for rapid manufacture of pasta products without product deformation or the necessity for delicate or extended drying procedures to avoid product checking or cracking would be desirable. Furthermore, improved quick cooking pasta products which quickly rehydrate to a desired degree in hot water, yet retain product integrity, would be desirable. In addition these improved quick cooking pasta products can also be rehydrated in 5 minutes in a microwave oven. These pasta products are also well suited to rehydration in a conventional oven without the need to pre-cook and drain as in the case with regular pasta.

Accordingly, it is an object of the present invention to provide improved methods for continuously manufacturing quick cooking pasta products which may be readily rehydrated with hot water to provide a fully cooked pasta product of high quality. It is another object of the present invention to provide such processes in which the pasta product is readily dried during manufacture to provide dry pasta product of high uniformity and physical integrity. It is a further object to provide such methods which are rapid and efficient in operation and energy utilization. It is a further object to provide improved quick cooking pasta products, having desirable storage, cooking and mouthfeel characteristics.

These and other objects of the invention will be more particularly described in the following detailed description and accompanying drawings, of which:

FIG. 1 is a schematic cross sectional view of a two-stage mixing and extrusion apparatus which may be utilized in carrying out an embodiment of the present invention;

FIG. 2 is a schematic illustration of an alternate embodiment of cooking and extrusion apparatus which may be utilized in accordance with the present invention; and FIG. 3 is a semischematic view of the segmented auger utilized in the first high temperature extrusion cook zone of the apparatus of FIG. 1, together with a graphical representation of internal temperature values at designated locations along the extrusion zone.

Generally in accordance with the present invention, quick cooking pasta such as macaroni, noodles or the like are manufactured in a continuous extrusion process under particular processing conditions.

In accordance with method aspects of the invention, a substantially completely gelatinized pasta dough is continuously and progressively formed in a first high temperature extrusion cooking zone, and the substantially completely gelatinized pasta dough is conducted from the first cooking extrusion zone to a second, low temperature pasta forming extrusion zone. The gelatinized pasta dough is extruded from the second, low temperature extrusion zone through suitably shaped openings, and is subsequently rapidly dried to provide a quick cooking pasta product. In the formation of the gelatinized pasta dough in the first extrusion zone, a uniformly mixed cereal composition is blended with water and steam to provide a pasta dough blend having a water content in the range of from about 25 to about 50 percent by weight of water based upon the total weight of the pasta dough blend. Desirably, the water blended with the cereal composition will have a temperature of at least about 90° F., and preferably at least about 110° F. The introduction of saturated steam into the dough component in the first cooking extrusion zone is believed to be an important feature of the method in providing the gelatinized pasta composition. In this regard, at least about 0.045 pounds, and preferably from about 0.06 to about 0.20 pounds of steam having a temperature of at least 275° F., is introduced into the pasta dough blend components in the first extrusion zone per pound of gelatinized pasta dough blend conducted from the zone, based on the total weight of the gelatinized dough conducted from the zone. Desirably, saturated steam may be introduced into the blend at a pressure in the range of from about 80 to about 100 pounds per square inch gauge into the pasta dough components in the first cooking extrusion zone. It is further an important feature that the formation of the gelatinized pasta dough be carried out in the first extrusion zone under shearing conditions at elevated pressures and temperatures substantially above the gelatinization temperatures of starches in the cereal composition of the pasta dough. In this regard, it is desirable that the pasta dough components be subjected to mechanical mixing work in the first zone of at least about 0.015 kilowatt hours per pound of gelatinized dough conducted from the zone preferably in the range of from about 0.018 to about 0.04 kilowatts per hour per pound of gelatinized pasta dough conducted from the zone in accordance with the method.

The mechanical shear in the first zone is desirably carried out at progressively elevated temperatures and pressures, and in this regard, the pasta dough should be subjected to mechanical shear in said first zone at a temperature in the range of from about 235° F. to about 350° F. and under a pressure in the range of about 5 to about 150 pounds per square inch gauge for a suitable, limited period of time to provide a homogeneous, substantially completely gelatinized pasta dough which is subsequently conducted therefrom to a second, low temperature extrusion zone. This may desirably be accomplished by extruding the homogeneous gelatinous pasta dough to the atmosphere to flash cool the dough to a temperature below about 212° F. and to evaporate a portion of the water content of the dough. The extrusion of superheated dough to the atmosphere may result in the evaporation of a significant amount of moisture (up to 5 weight percent or more of the moisture present in the dough).

As indicated, the dough product transported from the first high temperature extrusion zone must be substantially fully gelatinized. In this regard, the starch components of the gelatinized dough product of the first zone should best be at least about 95 percent gelatinized.

The gelatinized pasta dough blend from the first, high temperature extrusion zone may be subsequently introduced into a cooling extrusion zone which cools the gelatinous pasta dough under conditions of mechanical mixing to an extrusion temperature of from about 120° F. to about 200° F. to provide a conditioned pasta extrusion dough. The conditioned pasta extrusion dough may be extruded from the second extrusion zone through suitable openings of conventional design to provide a desired pasta product cross section, at pressures in the range of about 50 to 1500 psig (depending upon moisture content of dough and flow rate), at the die face to form a conditioned gelatinized pasta product. The gelatinized pasta dough introduced into the second forming extrusion zone from the first high temperature zone should have a moisture content in the range of from about 20 to about 50 percent by weight, and preferably in the range of from about 25 to about 35 percent based on the total weight of the pasta dough. The dough is subjected to progressive cooling in the second forming extrusion zone to the extrusion temperature of 120° F.–200° F., and the extruded, gelatinized, formed conditioned pasta extrusion dough is cut upon extrusion to form hydrated pasta pieces which are subsequently subjected to rapid drying at elevated temperatures. In this regard, the cut hydrated pasta product is rapidly dried at a temperature of from 130° F. to 250° F.

In accordance with a preferred embodiment of this invention, the farinaceous ingredient of the present invention may be provided by a product based completely upon wheat flour. When desired, however, wheat flour can be replaced by other farinaceous substances, such as durum, farina, semolina, corn flour, tapioca flour, or potato flour, or mixtures thereof. Other optional pasta ingredients such as salt for flavoring purposes, and egg yolk solids or whole egg solids where egg noodle products are desired, can be used. Soy flour, milk, wheat gluten, disodium phosphate, salt, spices, comminuted vegetables and meats, vegetable oil, shortening, leavening agents, mineral and vitamin enrichment, natural and artificial coloring agents, and natural and artificial flavoring agents may be used in moderate amounts to season, strengthen, fortify, color or flavor the product of this invention as is known in the art. Extrusion aids such as surfactants and emulsifiers are desirable components of the pasta blend. For example, lecithin, mono- and diglycerides, sodium stearyl-2-lactylate, propylene glycol, glyceryl, and sorbitan stearates and polysorbates may be used in the dough compositions.

As indicated, in accordance with the method, the temperature of cereal flour and added water is rapidly elevated under superatmospheric pressure to cooking temperatures of 235° to 350° by a combination of steam injection and mechanical shear during the period when the flour and water are forming a dough. The elevated temperature is maintained for a relatively short time period in the range of from about 15 to 100 seconds, following which the dough is conducted to a second cooling extrusuon zone where the gelatinized dough composition is progressively transported into a zone of increasing pressure and cooled therein. In this regard, the dough is cooled to a temperature below 212° F. and extruded through a die at elevated pressure and temperature below about 212° F. to form conventional pasta shapes.

The rapid cooking results in a product which hydrates more rapidly, has a superior mouthfeel, and maintains product integrity for a longer period than quick cooking pasta produced by other methods. The purpose of cooling gelatinized dough in the second extrusion zone is to prevent expansion of the extruded pasta pieces by evaporation of the water in the dough, and to provide a conditioned dough of high uniformity which may be extruded to form a dense homogeneous, gelatinized pasta product that may be rapidly dried. Upon drying, a dried, quick cooking pasta product is provided which may be rapidly rehydrated in hot water, and which maintains its physical integrity for a substantial period of time under such conditions. In this regard, the pasta product will desirably rehydrate when submerged in boiling water (212° F.) to provide a fully cooked pasta product which after exactly 2 minutes has at least about 45 and perferably at least about 49 percent by weight water, and which after exactly 5 minutes in boiling water will have less than 65 and preferably less than about 62 percent by weight water.

Turning now to the drawings, various aspects of the present invention will now be discussed with reference to the extrusion apparatus illustrated in FIG. 1. Illustrated in FIG. 1 is a cooking extruder 100 which may be an extruder such as Wenger F-25/20 cooker former sold by Wenger Manufacturing, Sabetha, Kans. The illustrated extruder 100 is modified to permit the dough, as it is extruded from an extruding cylinder 4 of the cooking extruder, to be exposed to the atmosphere.

The cooking extruder 100 is comprised of segmented auger sections 5 forming a continuous flight, enclosed in a barrel comprised of jacketed sections 8, and terminating in a flow restricting orifice 13. In accordance with conventional practice, the screw flights are separated by rings of predetermined wall clearance in the extruder barrels, as shown in the drawings. A cereal composition is placed in feed hopper 1 from which it is metered into the barrel with the positive feed auger 2. Hot water 3 and saturated high pressure steam 6 are also metered into the barrel, wherein the combined effects of mixing, mechanical shear, and steam input rapidly heat the dough to temperatures in the range of 235° to 350° F. The elevated temperature is maintained for a short period (usually in the range of from about 15 to about 100 seconds) after which the dough is rapidly cooled to a temperature below 212° F. upon discharge through the opening 13.

The cooled extrudate discharging through orifice 13 enters the cooling-forming extruder 9 where it is compressed, further cooled, formed into conventional pasta shapes through forming die 11 and cut into suitable length pieces using rotary cutter 12 and dried.

The barrel of the cooling-forming extruder is provided with jacketed sections 10 through which a cooling fluid (typically tap water at a temperature of 35°–70° F.) is circulated. The action of the auger 15 serves to create a progressively increasing pressure profile from the point of introduction of the pasta extrudate to the die 11, and to provide shearing contact of the pasta extrudate with the cooled walls of the jacketed sections 10 for progressive cooling thereof.

Another form of extruder 200 which may be used herein is shown diagramatically in FIG. 2. The extruder is comprised of segmented auger sections 5 forming a continuous flight, enclosed in a barrel comprised of jacketed sections 8 and terminating in a pasta forming die. A cereal compositon is placed in feed hopper 1 from which it is metered into the barrel with the positive feed auger 2. Hot water 3 and saturated high pressure steam 6 are also metered into the barrel, wherein the combined effects of mixing, mechanical shear, and heat rapidly heat the dough to temperatures in the range of 235° to 350° F. The barrel is sufficiently long to accomplish the heating and holding functions, as well as cooling the dough below 212° F. by coolant circulated in jacketed sections 10 before discharging through the forming die 11 and being cut and dried.

In the formation of the gelatinized dough, steam is introduced into ports 6 in the first extruding cylinder 7 which introduces substantial heat and moisture content, and which brings the moisture content by weight to a 20% to 50% level of the total weight of the cereal composition. Threads of a rotating screw in the extruding cylinder of the cooking extruder combine the cereal and water into dough by the rotating action of the screw flights 5. The length of the illustrated screw flights 5 of the first extrusion zone 7 is about 61 inches from the point it engages the cereal to the face of the die 3 from which cooked dough is extruded. The rotating screw transports the dough through steam jacketed heating sections 8 of the extruding cylinder. This indirectly heats the dough and aids in achieving temperatures substantially above the gelatinization temperatures of the starches present in the cereal composition and to as high as 350° F. This gelatinizes the starches in the dough even though the dough has a relatively short residence time in the heating sections of the cooking extruder. As the rotating screw transports the dough down the heating sections of the illustrated cooking extruder device 100, with rotational power input supplied to the extruder flight by appropriate motor 20, it is progressively heated and cooked under conditions of mechanical shear and saturated steam introduction to temperatures between 235° F.–350° F. under a pressure of about 5 to 150 pounds per square inch gauge to provide a homogeneous gelatinous pasta dough.

Returning to FIG. 1, the dough being transported down the heating sections of the cooking-extruder, is extruded from opening 13 as extrudate 14 with the final pressure at the interior face of the opening in the range of 60 to 150 psi. As the dough is extruded and discharged continuously from the cooking extruder at a temperature substantially above the atmospheric boiling point of water, it is exposed to the atmosphere whereupon a significant amount of moisture based upon the total weight of the dough is removed from the dough. The rapid expansion of the dough upon the extrusion of the pasta extrudate 14 to the atmosphere at temperatures exceeding the boiling point of water serves to cool the dough and to reduce the moisture content. However, the rapidly expanding dough is not directly formed into pasta pieces.

After being exposed to atmospheric pressure, the dough is continuously fed into a receiving hopper 16 of cooling extruder 9. From the receiving hopper, the dough is received by a rotating screw 15. The screw 15 transports the dough through water jacketed cooling sections 10 of the cooling extruder. As the dough is fed into the cooling sections 10, the dough is progressively cooled while being conducted along the barrel of the extruder 9, which is provided with water jackets 10 to cool the dough. As it is transported down the cooling section, the dough is desirably cooled under conditions of progressively increasing pressure to a temperature in the range of from about 120° to about 200° F. After being transported along the cooling extruder cylinder, the dough is extruded from the cooling extruder through a die 11 at a pressure of up to 1500 psig in desired pasta shapes as are known in the art. The rotating screw of the illustrated cooling extruder operates at a speed of about 30 rpm and is 45 inches long from where the dough is received to the face of the die 11 where the dough is extruded. Generally, the dough is subjected to the cooling action of the illustrated cooling extruder for approximately 5 minutes.

The extruded pasta is cut at the die face 11, and after cutting, the pasta pieces fall from the die onto a conveyor belt 17 to be carried through a continuous dryer 18. The dryer belt 17 moves the product continuously through the dryer, where the pasta pieces may be subjected to forced hot air drying temperatures of from about 130° F. to about 250° F.

The pasta may have a residence time of from about 5 to 60 minutes inside the dryer. The moisture content of the dry pasta product exiting from the dryer is approximately 6 to 13%.

It is an important advantage of the method that the pasta products can be dried within as little as 5 minutes at a temperature of 250° F. These higher temperatures result in shorter drying times depending upon the depth of the bed of product and the speed of the belt transporting the pasta through the dryer. Pasta so dried did not undergo a fragmentation or checking due to stresses within the pasta product during the drying process. It is well known that conventional macaroni products such as spaghetti, macaroni elbows and noodles must be dried under mild temperatures and controlled humidity conditions for long periods of time. Otherwise, the exterior of the products tend to dry before the interior portions, and stresses are created during drying which cause cracks to open in the pasta piece, or which cause checking after a short shelf life leading to disintegration upon reconstituting the pasta products in water. Checking greatly diminishes the value of the pasta that breaks into fine pieces. Drying according to the invention not only avoids the foregoing problems, but drys the pasta in a shorter period of time, achieves economy thereby and achieves a superior shelf life without shattering.

The following specific examples further illustrate various aspects of the present invention.

EXAMPLE I

A cereal mixture composed of 100 pounds of durum flour and one pound of concentrated glyceryl monostearate containing a minimum of 90% total monoesters was filled into the feed hopper, a Wenger F-25/20 cooking extruder, combination as schematically illustrated in FIG. 1. The mixture was fed at the rate of 6 pounds per minute into the cooking extruder with a force feeder screw. At the entrance of the cooking extruder, hot water was introduced to the cereal composition at the rate of 1.8 pounds per minute. Indirect steam at 100 psig was applied to the jackets of the first and second sections (FIG. 3) and direct steam was injected into the third section at the rate of 0.3 pounds per minute. The dough was blended and moved forward by the cooker screw rotating at 450 rpm. The dough was extruded from the last cooking section as a cylindrical shape to allow flash cooling at atmospheric pressure. The load current to the cooking extruder was 45 amperes, or 75% of full-load current. The load current on the extruder, without dough present at 450 rpm is about 20 amperes, so that the increased load current required by the processing of the dough product therein is about 25 amperes. The thermocouple temperature reading for the last section of the cooking extruder was 248° F. The dough extrudate was then fed continuously into a cooling-forming extruder. The thermocouple temperature reading for the last section of the cooling-forming extruder was 200° F.

The dough was extruded from the cooling-forming extruder through a macaroni die having inserts whose openings were of 0.138 inches outer diameter and 0.100 inches inner diameter, in the shape of a tube.

As the macaroni dough was released through the die, the dough was cut by a rotating flexible knife held under compression at an angle against the plate face of the die. After cutting, the macaroni shapes fell onto a conveyor belt where they were continuously carried to a forced hot air dryer (manufactured by Proctor Schwartz) having a drying air temperature of 210° F. The moisture content of the product entering the dryer was 28.2%. The dryer belt was set at a speed to move the product continuously with a residence time of 15 minutes inside the dryer. The moisture content of the dried macaroni was 8% by weight of the total weight of the macaroni upon exiting the dryer. The product was reconstituted alone in 3 minutes by adding boiling water and in 5 minutes when combined with a conventional sauce dry mix. The macaroni had a fully cooked taste devoid of chewiness or mushiness and the pieces retained their integrity upon standing after hydration.

EXAMPLE II

A manufacturing procedure is carried out substantially as in Example I, except that indirect steam at 100 psig was applied to the jackets of all seven cooking sections raising the temperature to 330° F. with direct steam injection into the third and fourth sections at the rate of 0.3 pounds per minute per section.

EXAMPLE III

A manufacturing procedure is carried out substantially as in Example I, except that indirect steam at 100 psig was applied to the jacket of the first cooking section, raising the temperature to 235° F. with direct steam injection into the fourth section at the rate of 0.3 pounds per minute.

EXAMPLE IIIA

A manufacturing procedure is carried out substantially as in Example I, except that no indirect steam was applied to the jackets, and with direct steam injected into the third and fourth sections at the rate of 0.4 pounds per minute.

EXAMPLE IV

A manufacturing procedure is carried out substantially as in Example I, except that two pounds of glyceryl monostearate were added instead of one pound.

The resulting macaroni product had an increased degree of tenderness upon hydration, when compared with that of Example I.

EXAMPLE V

A manufacturing procedure is carried out substantially as in Example I, except that half a pound of glycerl monostearate was added instead of one pound.

The resulting macaroni product had a decreased degree of tenderness upon hydration, when compared with that of Example I.

EXAMPLE VI

A manufacturing procedure is carried out substantially as in Example I, except that half a pound of disodium phosphate was added as a cooking aid to the cereal mixture.

EXAMPLE VII

A manufacturing procedure is carried out substantially as in Example I, except that one pound of 90% glyceryl monostearate was replaced with one pound of 52% glyceryl monostearate, in the cereal mixture.

EXAMPLE IX

A manufacturing procedure is carried out substantially as in Example I, except that one pound of egg white solids was added to the cereal mixture.

EXAMPLE X

A manufacturing procedure is carried out substantially as in Example I, except that the dough was extruded through a macaroni die having inserts whose openings were of 0.140 inches outer diameter and 0.100 inches inner diameter.

EXAMPLE XI

A manufacturing procedure is carried out substantially as in Example I, except that the dough was extruded through a macaroni die having inserts whose openings were of 0.130 inches outer diameter and 0.100 inches inner diameter.

EXAMPLE XII

A manufacturing procedure is carried out substantially as in Example I, except that the dough was extruded through a spaghetti die having inserts whose openings were of 0.086 inches outer diameter and 0.050 inches inner diameter with the spaghetti in the shape of a tube.

EXAMPLE XIII

A manufacturing procedure is carried out substantially as in Example I, except that the dough was extruded through a noodle die having inserts whose openings were 0.018 inches thick by one-quarter inches wide, with the noodle in the shape of a ribbon. The rotating knife was set to cut the ribbon pieces to a length of between 1 and 2 inches.

EXAMPLE XIV

A manufacturing procedure is carried out substantially as in Example XII, except that 0.75 pounds of salt and 5.5 pounds of dried whole eggs were added to the cereal mixture.

EXAMPLE XV

A manufacturing procedure is carried out substantially as in Example XII, except that 5.5 pounds of dried egg yolk were added to the cereal mixture.

EXAMPLE XVI

A manufacturing procedure is carried out substantially as in Example I, except that an 0.020 inches sheeting die was used. The dough sheet expanded to 0.030 inches and was then continuously put through a dough roller and thinned down to 0.020 inches, to be cut by cutting equipment into 1½ × ⅛ inch noodle pieces.

EXAMPLE XVII

A cereal mixture composed of 100 pounds of durum flour and one pound of concentrated glyceryl monostearate containing a minimum of 90% total monoesters were fed into a feed hopper of the cooking extruder. A Wenger X-20 extruder, as schematically described in FIG. 2 was used for this example. The mixture was fed at the rate of six pounds per minute into the cooking extruder with a force feeder screw. At the feeding section of the cooking extruder, hot water was introduced to the cereal composition at the rate of 1.8 pounds per minute. Indirect steam at 100 psig was applied to the jackets of the first, second, third, fourth and fifth sections and direct steam was injected into the third section at the rate of 0.3 pounds per minute.

The dough temperature was raised to 250° F. inside the first section and the dough under pressure moved forward by the extruder screw rotating at 450 rpm, through the cooling-forming extruder. The rotating screw transported the dough through the jacketed water cooling sections.

The thermocouple temperature reading for the last section of the cooking extruder was 310° F. The thermocouple temperature reading for the last section of the cooling-forming extruder was 190° F.

The dough was extruder from the cooling-forming extruded through a macaroni die having inserts whose openings were of 0.138 inches outer diameter and 0.100 inches inner diameter, with the macaroni in the shape of a tube. As the macaroni dough was released through the die, the dough was cut by a rotating pasta knife placed at an angle against the plate face of the die. After cutting the macaroni shapes fell onto a conveyor belt where they were continuously carried to a Procter & Schwartz dryer set up at 210° F. The dryer belt was set at a speed to move the product continuously with a residence time of 15 minutes inside the dryer. The moisture content of the dried macaroni was 8% by weight of the total weight of the macaroni. The product was reconstituted alone in 3 minutes by adding boiling water and in 5 minutes when combined with a conventional dry sauce mix. The macaroni had a fully cooked taste devoid of chewiness or mushiness and the pieces retained their integrity upon standing after hydration.

All the pasta products made in these examples were well cooked and hydrated completely in three minutes when exposed to an excess of boiling water, retaining their integrity at the end of three minutes. The supernatant water was transparent and practically free of the turbidity associated with undercooked pasta. When the pasta products are produced by undercooking below 235° F., uncooked flour tends to leach out of the pieces and into the water during the hydration test.

EXAMPLE XIX

A series of eight runs utilizing the equipment and pasta components as described in Example I is conducted to investigate heat and material balance, and operating conditions in the manufacture of pasta products. The results are set forth in the following Table, and in the accompanying graph of FIG. 3. The first extruder is operated at a speed of 450 rpm.

|  |  | Run #1 No Direct Steam No Jacket Steam Cold Water Feed | Run #2 No Direct Steam No Jacket Steam Hot Water Feed | Run #3 Jacket Steam Cold Water Feed | Run #4 Direct Steam (2nd Position) Hot Water Feed |
|---|---|---|---|---|---|
| Temp Zone 2 | (1)° F. | 83 | 95 | [2]— | 109 |
|  | (2)° F. | 89 | 106 | — | 115 |
| Temp Zone 3 | (1)° F. | 135 | 142 | 146 | 162 |
| Temp Zone 4 | (1)° F. | 164 | 156 | 151 | 209 |
|  | (2)° F. | 195 | 195 | 196 | 223 |
| Temp Zone 5 | (1)° F. | 247 | 242 | 242 | 257 |
| Internal pressure @ steam injector (psig) |  | 5 | 5 | 5 | 17 |
| Internal pressure @ cone head (psig) |  | 130–140 | 124–134 | 130–134 | 68–72 |
| Water rate lbs./min. |  | 2.05 | 2.02 | 2.05 | 2.02 |
| Flour rate lbs./min. |  | 6.15 | 6.15 | 6.15 | 6.15 |
| Extrudate rate (wet) lbs/min |  | 7.1 | 7.0 | 7.2 | 7.6 |
| Temp. of feed water °F. |  | 41 | 114 | 36 | 120 |
| Moisture content-extrudate after flash cooling |  | [1]26.4 | 28.6 | 32.4 | 31.4 |
| Load current-cooking extruder-amperes |  | 70 | 55–70 | 60 | 55–65 |
| Cook |  | poor | poor | poor | excellent |
|  |  | Run #5 Direct Steam (2nd Position) Jacket Steam Hot Water Feed | Run #6 Direct Steam (1st Position) Jacket Steam Hot Water Feed | Run #7 Direct Steam (2nd Position) Jacket Steam High Flour Rate | Run #8 No Direct Steam No Jacket Steam Cold Water Feed |
| Temp Zone 2 | (1)° F. | — | [2]— | [2]— | [2]78 |
|  | (2)° F. | — | — | — | 81 |
| Temp Zone 3 | (1)° F. | 202 | 210 | 180 | 108 |
| Temp Zone 4 | (1)° F. | 219 | 213 | 220 | 153 |
|  | (2)° F. | 225 | 221 | 222 | 148 |
| Temp Zone 5 | (1)° F. | 250 | 248 | 272 | 233 |

| -continued | | | | |
|---|---|---|---|---|
| Internal pressure @ steam injector (psig) | 5–15 | 5 | 5–7 | 10 |
| Internal pressure @ cone head (psig) | 74–80 | 80 | 106–116 | 145 |
| Water rate lbs./min. | 1.9 | 1.9 | 1.9 | 1.9 |
| Flour rate lbs./min. | 6.15 | 6.15 | 7.3 | 6.15 |
| Extrudate rate (wet) lbs/min | 7.6 | 7.6 | 9.0 | 7.2 |
| Temp. of feed water °F. | 114 | 114 | 112 | 112 |
| Moisture content-extrudate after flash cooling | 28.2 | 28.2 | 25.3 | 25.3 |
| Load current-cooking extruder-amperes | 44–46 | 44–46 | 65 | 58 |
| Cook | excellent | excellent | excellent | poor |

Flour moisture-11.3%
[1] 25% H₂O direct from nozzle
[2] Product temperatures in Zone 2 are not measurable due to steam in jackets The temperature measurements were made by thermocouple measurement devices at the indicated flight screws in zones 2 through 5 along the extruder barrel, and the pressure readings were made at the position indicated on FIG. 3. The temperature measurements of zone 2, runs 3, 5, 6 and 7 shown by dotted line in FIG. 3 primarily reflect steam jacket temperature, and are believed to be inaccurate in respect to product temperature.

This invention is not be construed as limited to the exact details of operation or to the compositions described as examples since obvious modifications will be apparent to those skilled in the art.

Accordingly, it will be appreciated that in accordance with the present invention, improved methods for the manufacture of quick cooking pasta products have been provided. While the present invention has been described with specificity with respect to particular embodiments, various modifications and adaptations thereof will become apparent based on the present disclosure, and are intended to be within the spirit and scope of the present invention.

Various features of the present invention are set forth in the following claims.

What is claimed is:

1. A method for preparing quick cooking pasta products comprising the steps of combining water, direct injection steam, and a dry cereal flour in a first extrusion cooking zone, mixing said combination under conditions of mechanical shear to provide a substantially fully gelatinized dough mixture having a water content in the range of about 25 to about 50 percent by weight of the total mixture, whereby said cereal dough mixture is rapidly heated above the atmospheric gelatinization temperatures of starches contained in the cereal composition to provide a homogeneous pasta dough;

maintaining the pasta dough at a temperature of 235° F. to 350° F. under pressure for a sufficient period of time in the range of about 15 to about 100 seconds to substantially completely gelatinize the starch component of the pasta composition;

introducing said dough into a cooling-forming extruder wherein the dough is cooled to a temperature in the range of about 130° F. to below the boiling temperature of water, and extruding the dough from the cooling-forming extruder through a die to shape the same and continuously drying the pasta shapes at temperatures from 130° F. to 250° F. to rapidly reduce the moisture of the pasta products to from 6 to 13% by weight of the total weight of the product.

2. The method of claim 1, in which the cooking and the cooling and forming steps of the dough are performed continuously in the same extrusion apparatus.

3. The method of claim 1 in which the cooking and the cooling-forming steps are performed in separate extrusion apparatus by continuously transferring the cooked extrudate from the cooking extrusion apparatus to atmospheric pressure to allow flash cooling and then into a cooling-forming extrusion apparatus to complete additional cooling.

4. A method as recited in claim 1 wherein said cereal composition comprises glyceryl monostearate, disodium phosphate and a farinaceous substance selected from the group consisting of farina, durum, semolina, corn flour, potato flour, tapioca flour and wheat flour.

5. A method as recited in claim 1 wherein said cereal composition contains glyceryl monostearate, dried egg yolk, and a farinaceous substance selected from the group consisting of farina, durum, semolina, corn flour, potato flour, tapioca flour and wheat flour.

6. A method as recited in claim 1 wherein said cereal composition contains glyceryl monostearate, dried whole egg, and a farinaceous substance selected from the group consisting of farina, durum, semolina, corn flour, potato flour, tapioca flour and wheat flour.

7. A method as recited in claim 1 wherein said cereal composition contains glyceryl monostearate and a farinaceous substance selected from the group consisting of farina, durum, semolina, corn flour, potato flour, tapioca flour and wheat flour.

8. A method as recited in claim 1 wherein said water content in said gelatinized mixture introduced into the cooling-forming extruder is in the range of about 25 to about 35 percent by weight based upon the total weight of the gelatinized dough.

9. A method for preparing quick cooking pasta products comprising: combining water, direct injection steam, and a dry cereal flour in a first extrusion cooking zone under conditions of mechanical shear to provide a dough component;

heating said dough component above the atmospheric gelatinization temperatures of starches in the cereal flour by said direct injection steam in an amount of about 0.06 to about 0.20 pounds of said steam having a temperature of at least about 275° F. per pound of gelatinized pasta dough blend conducted from said first zone;

maintaining the dough component in said first zone at a temperature of 235° F. to 350° F. under pressure for a sufficient period of time in the range of about 15 to about 100 seconds to substantially completely gelatinize the starch component of the cereal dough mixture to provide a gelatinized pasta dough blend having a water content in the range of about 25 to about 50 percent by weight of water based upon the total weight of the gelatinized pasta dough blend;

introducing the gelatinized pasta dough blend into a cooling-forming extruder zone wherein the gelatinized pasta dough blend is cooled to a temperature in the range of about 130° F. to below the boiling temperature of water to provide a conditioned pasta extrusion dough; and forming the conditioned pasta extrusion dough into pasta shapes from the cooling-forming extruder zone by means of a die and continuously drying the pasta shapes at temperatures from 130° F. to 250° F. to form pasta products and to rapidly reduce the moisture of the pasta products to about 6 to about 13% by weight of the total weight of the products.

10. A method as recited in claim 9 wherein said direction injection steam has a pressure in the range of about 80 to about 100 psig.

11. A method as recited in claim 9 wherein said conditions of mechanical shear in said first extrusion cooking zone comprise work in amount of about 0.018 to about 0.04 kilowatts per hour per pound of gelatinized pasta dough blend conducted from said first extrusion cooking zone.

12. A method as recited in claim 9 wherein said gelatinized pasta dough blend has a water content in the range of about 25 to about 35 percent by weight of water based upon the total weight of the gelatinized pasta dough blend.

13. A method as recited in claim 9 wherein the gelatinized pasta dough blend is cooled to a temperature in the range of about 130° F. to about 200° F. in said cooling-forming extruder zone.

14. A method as recited in claim 12 wherein the gelatinized pasta dough blend is flash cooled with exposure to the atmosphere prior to introducing the gelatinized pasta dough blend into the cooling-forming extruder zone.

* * * * *